US012578821B2

(12) United States Patent
Seo et al.

(10) Patent No.: US 12,578,821 B2
(45) Date of Patent: Mar. 17, 2026

(54) TOUCH SENSING DEVICE HAVING MALFUNCTION PREVENTION FUNCTION

(71) Applicant: ABOV Semiconductor Co., Ltd., Cheongju-si (KR)

(72) Inventors: Youngjin Seo, Seoul (KR); Yoonki Kim, Seoul (KR); Seohan Lee, Seoul (KR); Yeongjin Mun, Seoul (KR); Sangho Woo, Seoul (KR)

(73) Assignee: ABOV Semiconductor Co., Ltd., Cheongju-si (KR)

( * ) Notice: Subject to any disclaimer, the term of this patent is extended or adjusted under 35 U.S.C. 154(b) by 253 days.

(21) Appl. No.: 18/518,312

(22) Filed: Nov. 22, 2023

(65) Prior Publication Data

US 2024/0086016 A1     Mar. 14, 2024

Related U.S. Application Data

(63) Continuation of application No. PCT/KR2022/007432, filed on May 25, 2022.

(30) Foreign Application Priority Data

May 25, 2021    (KR) ........................ 10-2021-0067166
May 17, 2022    (KR) ........................ 10-2022-0059922

(51) Int. Cl.
*G06F 3/041* (2006.01)

(52) U.S. Cl.
CPC .................. *G06F 3/04186* (2019.05); *G06F 2203/04107* (2013.01)

(58) Field of Classification Search
CPC ....... G06F 3/04186; G06F 2203/04107; G06F 3/0418; G06F 3/0446; G06F 3/041; G06F 3/044
See application file for complete search history.

(56) References Cited

U.S. PATENT DOCUMENTS

| | | | |
|---|---|---|---|
| 2008/0136792 A1* | 6/2008 | Peng ................... | G06F 3/04186 345/174 |
| 2011/0199327 A1 | 8/2011 | Shin et al. | |
| 2012/0050186 A1 | 3/2012 | Yi et al. | |
| 2012/0050214 A1* | 3/2012 | Kremin ............... | G06F 3/04186 345/174 |
| 2012/0092288 A1* | 4/2012 | Wadia ..................... | G06F 3/044 345/174 |

(Continued)

FOREIGN PATENT DOCUMENTS

| | | |
|---|---|---|
| KR | 10-0971501 B1 | 7/2010 |
| KR | 10-1323094 B1 | 11/2013 |
| KR | 10-1756668 B1 | 7/2017 |

OTHER PUBLICATIONS

International Search Report of PCT/KR2022/007432 mailed on Sep. 1, 2022.

*Primary Examiner* — Temesghen Ghebretinsae
*Assistant Examiner* — Sosina Abebe
(74) *Attorney, Agent, or Firm* — WTA IP Law P.C.

(57) ABSTRACT
The present invention provides a touch sensing device having a malfunction prevention function, in which a grounded shield region is further disposed around at least one touch pad, thereby minimizing influence of a water drop settling between the touch pad and the shield region on an actual user touch.

14 Claims, 13 Drawing Sheets

(56)　　　　　References Cited

U.S. PATENT DOCUMENTS

2012/0249446 A1* 10/2012 Chen ..................... G06F 3/0446
                                                   345/173
2014/0192001 A1*  7/2014 McKillop ........... G06F 3/04886
                                                   345/173
2016/0004278 A1*  1/2016 Hotelling ............... G06F 1/169
                                                   345/174
2018/0253186 A1*  9/2018 Lee ....................... G06F 3/0443

* cited by examiner

Sensing Wave

Shield CH

Touch CH

TOUCH SENSING DEVICE HAVING MALFUNCTION PREVENTION FUNCTION

CROSS-REFERENCE TO RELATED APPLICATIONS

This is a bypass continuation of International PCT Application No. PCT/KR2022/007432, filed on May 25, 2022, which claims priority to Republic of Korea Patent Application No. 10-2021-0067166, filed on May 25, 2021 and Republic of Korea Patent Application No. 10-2022-0059922, filed on May 17, 2022, which are incorporated by reference herein in their entirety.

TECHNICAL FIELD

The present invention relates to a touch sensing device having a malfunction prevention function, more particularly to a touch sensing device having a malfunction prevention function, in which a grounded shield region is further disposed around a touch part, thereby minimizing influence of a water drop settling between the touch part and the shield region on an actual user touch.

BACKGROUND ART

In various electronic devices, use of touch panels is increasing as a means that allows a user to input commands to an electronic device by touching a screen displayed thereon. Among techniques for detecting a touch on a touch panel, a method of detecting a change in capacitance is most frequently used, and a touch sensor circuit is used to detect the change in capacitance.

FIG. 1 shows a typical touch sensor circuit. Referring to FIG. 1, a typical touch sensor circuit includes a touch pad 11, a touch sensor device 13 detecting a change in capacitance when a user touches the touch pad 11, and a shield member 12 disposed around the touch pad 11 and connected to a ground voltage GND.

The touch pad 11 is electrically connected to the touch sensor device 13 via a first node Node 1. When a user does not touch the touch pad 11, the touch sensor device 13 detects the capacitance of a capacitor Cperi connecting the first node Node 1 to the ground voltage.

When a user touches the touch pad 11, a capacitance in the range of a few femtofarads (fFs) to tens of picofarads (pF) is generated between the first node Node 1 and the ground voltage GND or VSS. Here, the touch sensor device 13 detects the sum of the capacitance generated by the user touch and the capacitance of the capacitor Cperi. In this way, the touch sensor device 13 can determine the presence of a user touch on the touch pad 11 by comparing the capacitance sum with the capacitance when a user does not touch the touch pad 11.

FIG. 2 shows an example of a case in which foreign matter, such as water, settles on the typical touch sensor circuit.

FIG. 2 shows a situation in which conductive foreign matter such as a water drop, rather than a user's finger, settles between the touch pad 11 and the shield member 12. Settling of the conductive foreign matter causes formation of a new capacitor Cwater. Here, the water drop acts as a means through which the first node Node 1 connected to the touch pad 11 is connected to the other terminal of the capacitor Cwater, causing formation of a circuit which is identical to a circuit formed when a user touches the touch pad 11, except for a difference in capacitance.

The background technique of the invention is disclosed in Korean Patent Laid-open Publication No. 10-2007-0097960 (Oct. 5, 2007) and Korean Patent Registration No. 10-2248984 (Apr. 30, 2021). However, since the magnitude of capacitance generated by a user touch is significantly small, such typical touch sensor circuits have difficulty in distinguishing a user touch from settling of foreign matter, such as water, thereby causing misrecognition of settling of the foreign matter as a user touch.

SUMMARY

It is an aspect of the present invention to provide a touch sensing device having a malfunction prevention function, in which a grounded shield region is further disposed around at least one touch pad, thereby minimizing influence of a water drop settling between the touch pad and the shield region on an actual user touch.

In accordance with one aspect of the present invention, a touch sensing device having a malfunction prevention function includes: a touch pad; a shield pad formed of a conductor and spaced apart from the touch pad to surround a periphery of the touch pad; a high-sensitivity sensing circuit electrically connected to the touch pad to detect a user touch on the touch pad; a first capacitor having one terminal connected to a first node connecting the touch pad to the high-sensitivity sensing circuit and the other terminal connected to ground; and a shield pad drive circuit electrically connected to the shield pad, wherein, when conductive foreign matter settles between the touch pad and the shield pad, a capacitor is formed between the touch pad and the shield pad due to the conductive foreign matter and the shield pad drive circuit applies the same signal as a signal applied to one terminal of the capacitor to the other terminal of the capacitor.

In accordance with another aspect of the present invention, a touch sensing device having a malfunction prevention function includes: a plurality of touch pads; a shield pad formed of a conductor and spaced apart from the plurality of touch pads to surround a periphery of the plurality of touch pads; a high-sensitivity sensing circuit electrically connected to the plurality of touch pads to detect a user touch on the plurality of touch pads; a first capacitor having one terminal connected to a first node connecting the plurality of touch pads to the high-sensitivity sensing circuit and the other terminal connected to ground; a shield pad drive circuit electrically connected to the shield pad; and a shield channel drive circuit electrically connected to the plurality of touch pads, wherein, when the high-sensitivity sensing circuit detects the presence of a touch on each of the touch pads, the shield channel drive circuit switches other touch pads than a corresponding touch pad such that the other touch pads perform the same role as the shield pad; and when conductive foreign matter settles between two neighboring touch pads or between the shield pad and one of the plurality of touch pads, a capacitor is formed between the two neighboring touch pads or between the shield pad and the one touch pad due to the conductive foreign matter, and the shield pad drive circuit and the shield channel drive circuit apply the same signal as a signal applied to one terminal of the capacitor to the other terminal of the capacitor.

In accordance with still another aspect of the present invention, a touch sensing device having a malfunction prevention function includes: a plurality of touch pads; a shield pad formed of a conductor and surrounding an entire periphery of the plurality of touch pads; a high-sensitivity sensing circuit electrically connected to the plurality of touch pads to detect a user touch on the plurality of touch pads; a first capacitor having one terminal connected to a first node connecting the plurality of touch pads to the high-sensitivity sensing circuit and the other terminal grounded; a shield pad drive circuit electrically connected to the shield pad; and a shield channel drive circuit array comprising a plurality of shield channel drive circuits each electrically connected to some touch pads among the plurality of touch pads, wherein, when the high-sensitivity sensing circuit detects the presence of a touch on each of the touch pads, the shield channel drive circuit array switches other touch pads than a corresponding touch pad such that the other touch pads perform the same role as the shield pad; and when conductive foreign matter settles between two neighboring touch pads or between the shield pad and one of the plurality of touch pads, a capacitor is formed between the two neighboring touch pads or between the shield pad and the one touch pad due to the conductive foreign matter, and the shield pad drive circuit and the shield channel drive circuit array apply the same signal as a signal applied to one terminal of the capacitor to the other terminal of the capacitor.

In accordance with still another aspect of the present invention, a touch sensing device having a malfunction prevention function includes: a touch wheel having a plurality of touch pads radially arranged thereon to recognize a user's touch; a shield pad formed of a conductor and surrounding a periphery of the plurality of touch pads of the touch wheel; a sensing circuit electrically connected to the touch wheel and the shield pad to detect a user touch on the touch wheel and output a sensing waveform to the shield pad, wherein the sensing circuit is connected to the plurality of touch pads via respective sensing channels and is connected to the shield pad via a shield channel, and the shield channel outputs the same waveform as the sensing channels to prevent a potential difference between the shield pad and the touch pads.

Upon detection of the presence of a user touch on one touch pad among the plurality of touch pads, the sensing circuit allows other touch pads than the one touch pad to output the same waveform as the shield channel such that the other touch pads perform the same role as the shield pad.

Upon recognition of a user touch on the plurality of touch pads, the sensing circuit sequentially performs capacitive sensing for the plurality of touch wheel pads through the sensing channels and allows sensing channels other than a sensing target to output the same waveform as the shield channel.

The shield channel is enabled when the sensing circuit sequentially determines the presence of a user touch on the touch wheel pads.

The sensing circuit includes: a sensing part electrically connected to the touch wheel pads to detect a user touch on the touch wheel pads; a capacitor having one terminal connected to a first node connecting the touch wheel pads to the sensing part and the other terminal connected to ground; a shield pad part electrically connected to the shield pad; and a shield channel part electrically connected to the plurality of touch pads, wherein, when the sensing circuit detects the presence of a touch on each of the touch wheel pads, the shield channel part switches other touch wheel pads than a corresponding touch wheel pad such that the other touch wheel pads perform the same roles as the shield pad; and when conductive foreign matter settles between one of the plurality of touch pads and the shield pad, a capacitor is formed between the one touch pad and the shield pad due to the foreign matter, and the shield pad part and the shield channel part apply the same signal as a signal applied to one terminal of the capacitor to the other terminal of the capacitor.

The shield channel part includes: an amplifier buffering externally applied voltage; a second switch switching an output of the amplifier to a third node in response to a third switch control signal; a third switch switching the third node to ground in response to a second switch control signal; and at least one first switch each switching the third node to a corresponding one of the at least one touch pad in response to a corresponding one of at least one shield channel control signal.

It will be understood that the present invention is not limited to the above object and other objects of the present invention will become apparent to those skilled in the art from the detailed description of embodiments.

When used in application in which a single touch pad is used, a touch sensing device having a malfunction prevention function according to the present invention can distinguish settling of conductive foreign matter on a touch pad from a user touch on the touch pad, thereby preventing malfunction of the touch pad. In addition, when used in an application in which a plurality of touch pads is used in parallel, the touch sensing device according to the present invention can distinguish settling of conductive foreign matter between two neighboring touch pads or between one of the plurality of touch pads and a shield pad from a user's touch, thereby preventing malfunction of the touch pads.

BRIEF DESCRIPTION OF THE DRAWINGS

The accompanying drawings are provided for better understanding of exemplary embodiments of the present invention in conjunction with the detailed description thereof. However, it will be understood that the technical features of the present invention are not limited to any particular drawing and the features disclosed in respective drawings may be combined into a new embodiment.

FIG. 11 shows one embodiment of a shield pad drive circuit and a shield channel drive circuit shown in FIG. 10.

DETAILED DESCRIPTION

Figure 1:
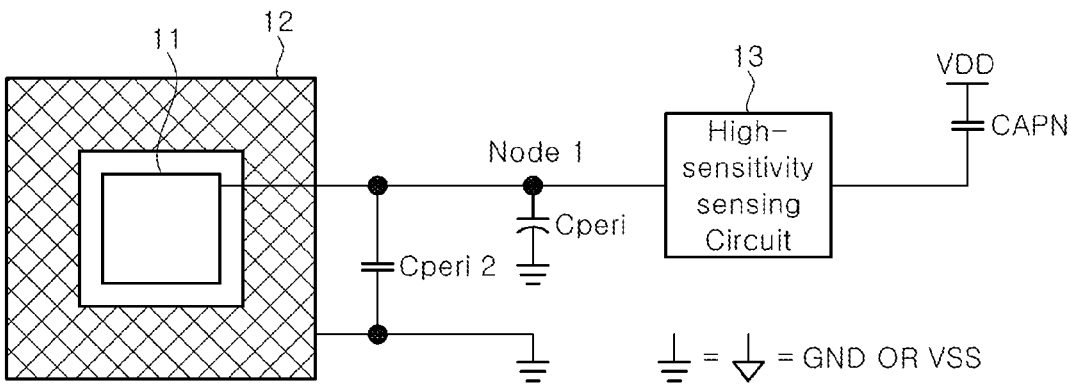
FIG. 1 shows a typical touch sensor circuit.
Figure 2:
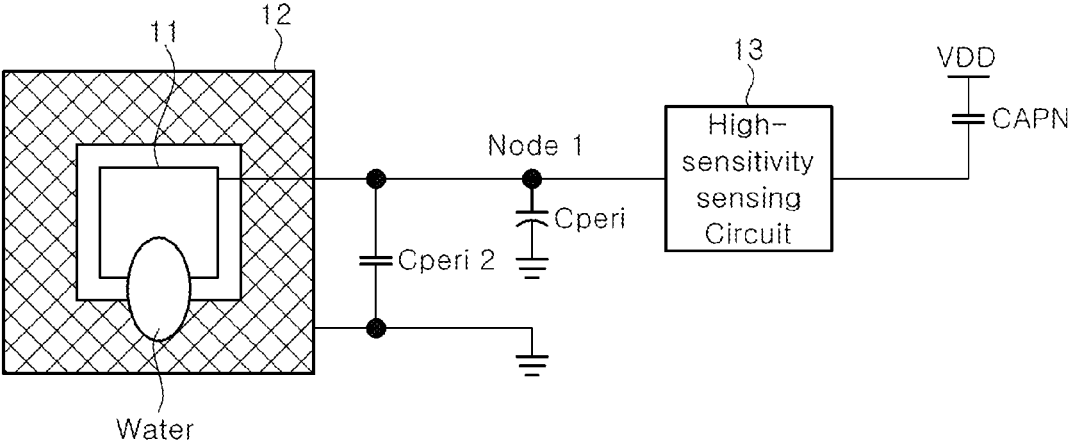
FIG. 2 shows an example of a case in which foreign matter, such as water, settles on the typical touch sensor circuit.
Figure 2:
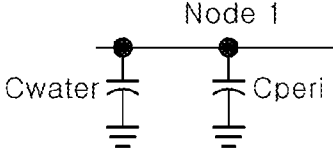

Hereinafter, embodiments of the present invention will be described with reference to the accompanying drawings.

The above and other aspects, features, and advantages of the present invention will become apparent from the detailed description of the following embodiments in conjunction with the accompanying drawings.

It should be understood that the present invention is not limited to the following embodiments and may be embodied in different ways, and that the embodiments are provided for complete disclosure and thorough understanding of the present invention by those skilled in the art. The scope of the present invention is defined only by the claims.

In addition, descriptions of known functions and constructions which may unnecessarily obscure the subject matter of the present invention will be omitted.

In addition, features disclosed in the drawings may be combined and implemented as new embodiments.

Figure 3:
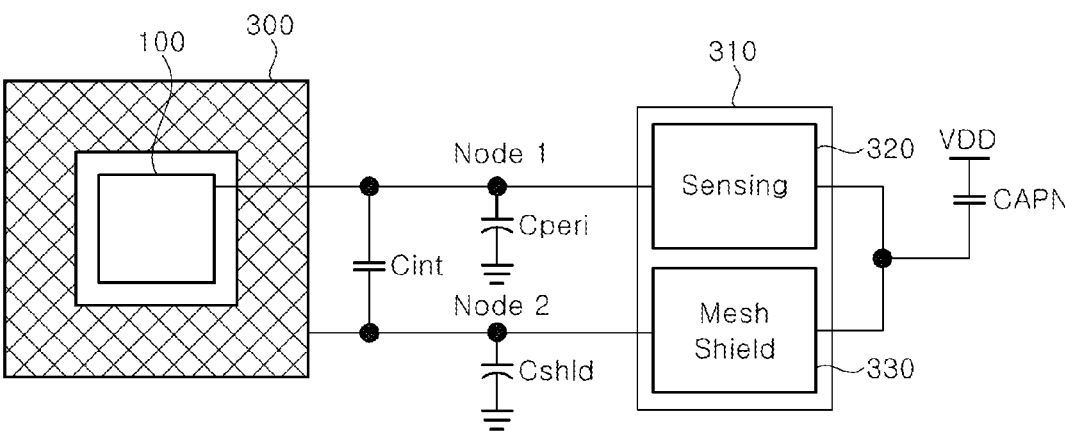
FIG. 3 shows one embodiment of a touch sensing device having a malfunction prevention function according to the present invention.

FIG. 3 shows one embodiment of a touch sensing device according to the present invention.

Referring to FIG. 3, a touch sensing device having a malfunction prevention function according to the present invention includes a touch pad 100, a shield pad 300, a high-sensitivity sensing part 320, a shield pad part 330, and a first capacitor Cperi.

The touch pad 100 is electrically connected to the high-sensitivity sensing part 320 via a first node Node 1, and the shield pad 300 is spaced apart from the touch pad 100 to surround the touch pad 100 and is electrically connected to the shield pad part 330 via a second node Node 2. Here, the shield pad 300 is provided in the form of a mesh to minimize the capacity between the shield pad 300 and ground GND while functioning as a shield channel. The reason why the shield pad 300 is provided in the form of a mesh is that power consumption required to drive a capacitor Cshld connecting the shield pad 300 to a ground voltage GND increases with increasing area of the shield pad 300.

The first capacitor Cperi has one terminal connected to the first node Node 1 and the other terminal grounded (GND).

Although not shown in FIG. 3, an insulator is disposed between the touch pad 100 and the shield pad 300, and upper surfaces of the touch pad 100 and the shield pad 300 are covered with a transparent insulator, such as glass. Due to this structural feature, the following capacitors are formed between ground and each of the two nodes Node 1, Node 2 and between the two nodes Node 1, Node 2: a shield capacitor Cshld between the second node Node 2 and ground; and a third capacitor Cint between the two nodes Node 1, Node 2.

In addition, the touch sensing device includes a fourth capacitor CAPN having one terminal connected to a power voltage VDD and the other terminal connected in common to the high-sensitivity sensing part 320 and the shield pad part 330. As will be described below, when the high-sensitivity sensing part 320 detects the presence of a touch on the touch pad, electric charge stored in the fourth capacitor CAPN is decreased by an amount equal to the capacity of the first capacitor Cperi. Here, the time taken for the voltage level of the fourth capacitor CAPN to drop to a predetermined reference voltage VREF is set as a first count value. The first count value is assumed to correspond to a state when a user's finger does not touch the touch pad 100.

When a user's finger touches the touch pad 100, a capacitor is added between the first node Node1 and the ground voltage GND, thereby causing increase in overall capacitance and thus shortening the time taken for the voltage level of the fourth capacitor CAPN to drop to the reference voltage VREF. Assuming that the value of counting such time is a second count value, a determination can be made as to whether a user's finger touches the tough pad 100 through comparison of the first count value with the second count value.

When conductive foreign matter settles between the touch pad 100 and the shield pad 300, a fifth capacitor (not shown, see FIG. 7) is formed between the touch pad 100 and the shield pad 300. Here, a shield pad drive circuit 340 applies the same signal as a signal applied to one terminal (Node 1) of the fifth capacitor to the other terminal (Node 2) of the fifth capacitor. In this way, when conductive foreign matter settles between the touch pad 100 and the shield pad 300, it is possible to distinguish settling of the foreign matter from a user touch on the touch pad 100. This will be described in detail further below.

Figure 4:
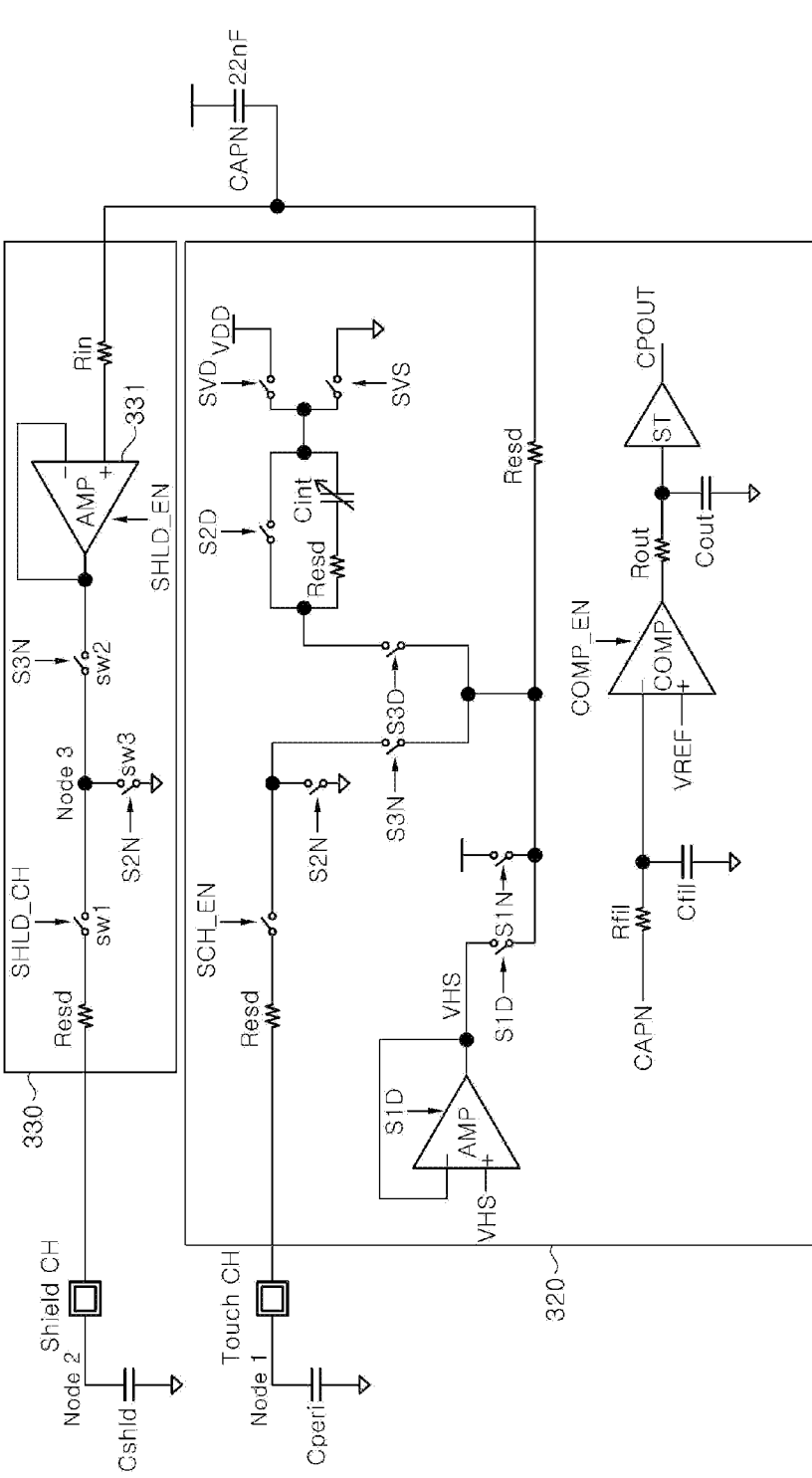
FIG. 4 shows one embodiment of a high-sensitivity sensing circuit and a shield pad drive circuit shown in FIG. 3.

FIG. 4 shows one embodiment of the high-sensitivity sensing part and the shield pad part shown in FIG. 3.

Since the invention disclosed in Korean Patent Registration 10-2248984 (registered on Apr. 30, 2021) is proposed to be used as the high-sensitivity sensing part 320 of FIG. 4, the circuit configuration and operation of the high-sensitivity sensing part 320 will not be described in detail herein.

The shield pad part 330 may be implemented by an amplifier 331 and three switches sw1 to sw3, wherein resistors Resd, Rin may be added thereto as needed.

The amplifier 331 buffers voltage applied from the outside (CAPN) in response to a shield enable signal SHLD_EN. The first switch sw1 switches a third node Node 3 to the second node Node 2 in response to a shield channel control signal SHLD_CH. The second switch sw2 switches an output of the amplifier 341 to the third node Node 3 in response to a third switch control signal S3N. The third switch sw3 switches the third node 3 to ground in response to a second switch control signal S2N.

Here, the second switch control signal S2N and the third switch control signal S3N are both signals used in the high-sensitivity sensing part 320. Determination of whether a user touches the touch pad 100 is made by counting the number of second switch control signals S2N or third switch control signals S3N.

Figure 5:
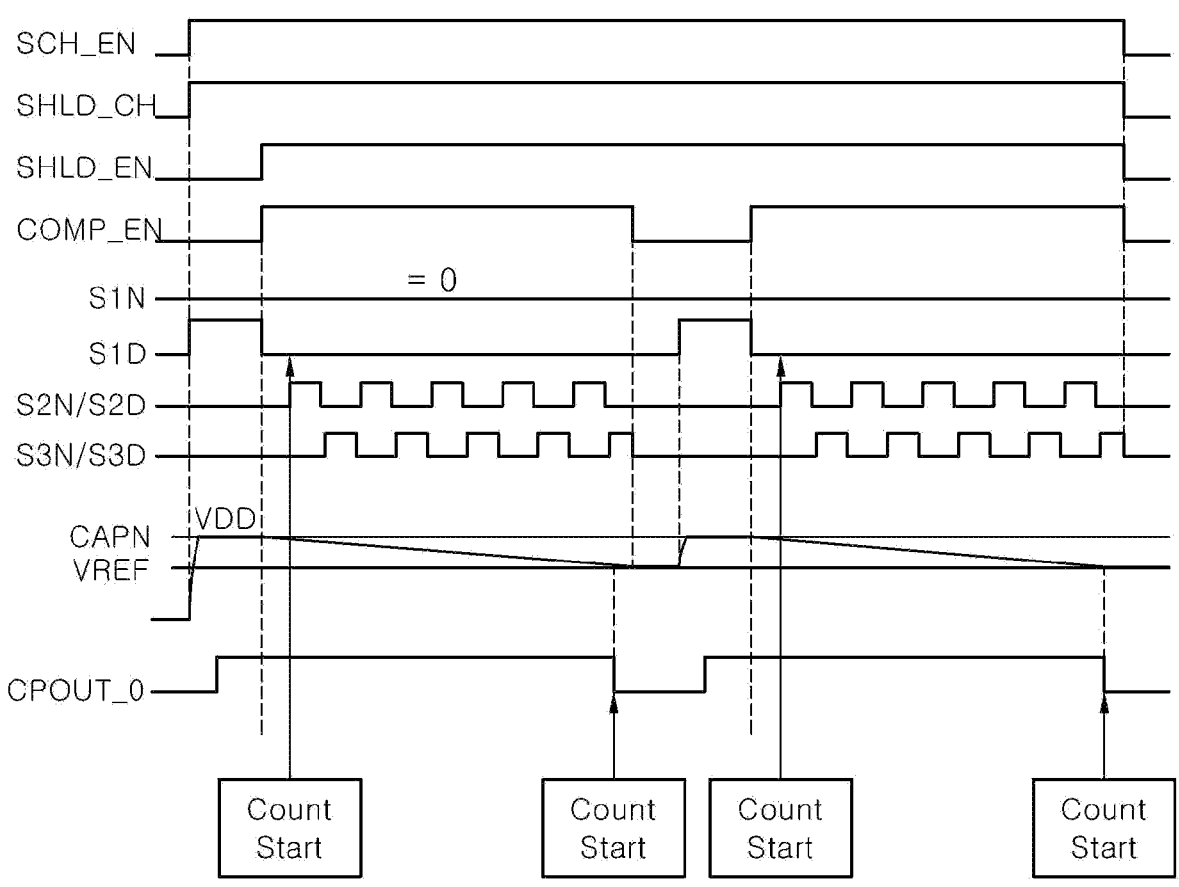
FIG. 5 shows signals used in the high-sensitivity sensing circuit and the shield pad drive circuit.

FIG. 5 shows signals used in the high-sensitivity sensing part and the shield pad part.

Reference numerals SCH_EN, COMP_EN, and CPOUT shown in FIG. 5 correspond to signals Sch, EN, and VOUT described in Korean Patent Registration No. 10-2248984, respectively.

In the touch sensing device having a malfunction prevention function according to the present invention, touch sensing is performed when SCH_EN and SHLD_CH are in an enabled state. Here, the enabled state means when SCH_EN and SHLD_CH are in a logic-high state and thus the switches operated in response to SCH_EN and SHLD_CH are turned on. Referring to FIG. 4, when SCH_EN and SHLD_CH are in the enabled state, a shield channel Shield CH and a touch channel Touch CH are both enabled.

When a predetermined period of time (logic-high period of S1D) elapses after SCH_EN and SHLD_CH are enabled, a corresponding amplifier is enabled by signal SHLD_EN and signal COMP_EN. During enabling of the amplifier, the time taken for the power voltage VDD stored in the fourth capacitor CAPN to drop to the reference voltage VREF is counted. Here, signal S1D is a signal used to control the amount of electric charge stored in the fourth capacitor CAPN or to discharge the fourth capacitor CAPN. In addition, signals used in the shield pad part 330 are identical to the signals used in the high-sensitivity sensing part 320 except that the rest of signal S1D, excluding a portion thereof enabled at the beginning of signal SCH_EN or signal SHLD_CH, becomes SHLD_EN. Since operation of these signals is described in Korean Patent Registration No. 10-2248984, detailed description thereof will be omitted herein.

Figure 6:
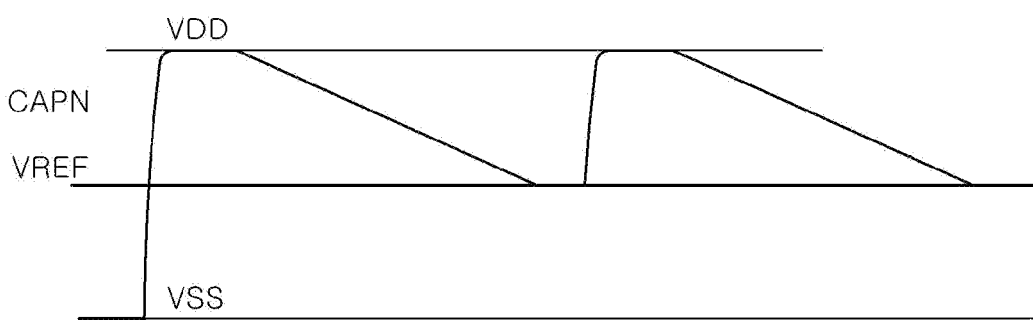
FIG. 6 shows waveforms in a touch channel and a shield channel during enabling of the high-sensitivity sensing circuit and the shield pad drive circuit.
Figure 6:
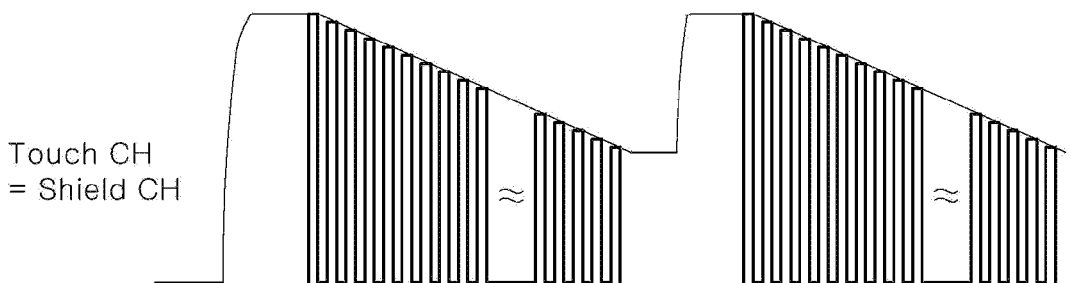

FIG. 6 shows waveforms generated in the touch channel and the shield channel during enabling of the high-sensitivity sensing part and the shield pad part.

Referring to FIG. 6, in the present invention, a counting waveform is the same in both the touch channel Touch CH (Node 1 in FIG. 3) and the shield channel Shield CH (Node 2 in FIG. 3). This is because, during enabling of SCH_EN and SHLD_CH, switching operation of the second switch sw2 and the third switch sw3 operated in response to the second switch control signal S2N and the third switch control signal S3N is controlled such that a change in voltage level of the fourth capacitor CAPN is reflected in the shield channel Shield CH, that is, the second node Node 2, as shown in FIG. 4.

Figure 7:
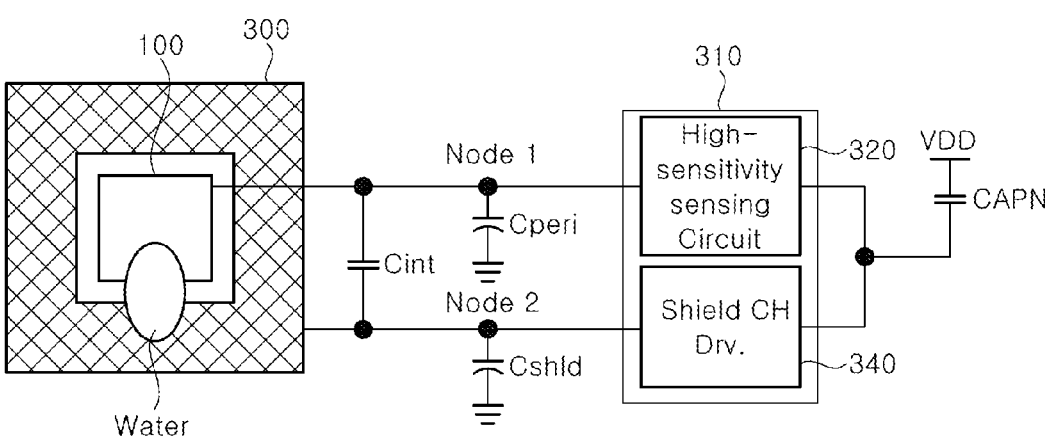
FIG. 7 shows a case in which a water drop settles on a touch pad and a shield pad of the touch sensing device according to the present invention.
Figure 7:
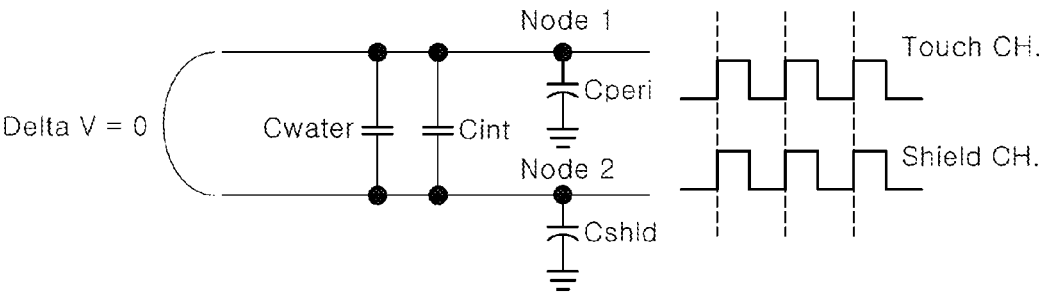

FIG. 7 shows a case in which a water drop settles on the touch pad and the shield pad of the touch sensing device according to the present invention.

Referring to FIG. 7, when a water drop settles between the touch pad 100 and the shield pad 300, a fifth capacitor Cwater is formed between the two nodes Node 1, Node 2. Referring to the lower part of FIG. 7, there is no difference in output waveform between the touch channel Touch CH, that is, the first node Node 1, and the shield channel Shield CH, that is, the second node Node 2. Since a voltage difference between the two nodes Node 1, Node 2 is zero (Delta V=0), the fifth capacitor Cwater formed due to the water drop Water has no influence on a user touch operation.

As described above, the core idea of the present invention is to allow waveforms from the touch channel Touch CH (Node 1) and the shield channel Shield CH (Node 2) to be identical to each other upon settling of conductive foreign matter such as a water drop between the touch pad 100 and the shield pad 300, thereby minimizing the possibility that settling of the water drop will be mistaken for a user's touch.

In the embodiment shown in FIG. 3, the touch sensing device has been described as including one touch pad and one shield pad. However, the touch sensing device may have a structure in which a plurality of touch pads is surrounded by one shield pad, as described below.

Figure 8:
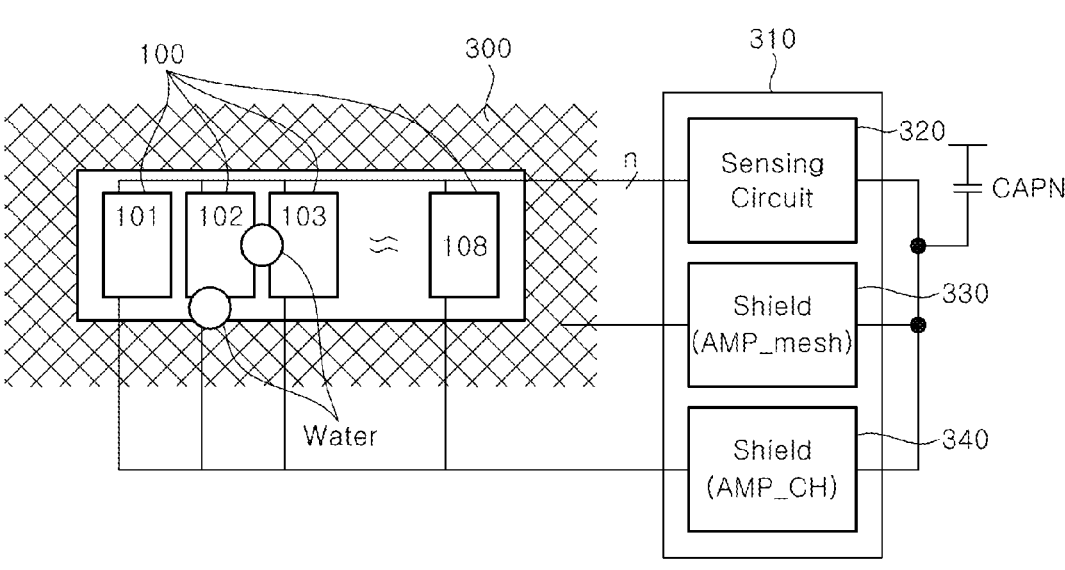
FIG. 8 shows an embodiment in which a single shield pad surrounds a plurality of touch pads.

FIG. 8 shows an embodiment in which one shield pad surrounds a plurality of touch pads.

Referring to FIG. 8, in a structure in which a plurality of touch pads 101 to 108 arranged in parallel is surrounded by one shield pad 300, each of the plurality of touch pads 101 to 108 is connected in common to a high-sensitivity sensing part 320 and a shield channel part 340. A structure in which the shield pad 300 is connected to a shield pad part 330 is the same as that in the embodiment shown in FIG. 3. The high-sensitivity sensing part 320, the shield pad part 330, and the shield channel 340 are connected to a fourth capacitor CAPN.

In the embodiment shown in FIG. 8, when the high-sensitivity sensing part 320 detects the presence of a touch on each touch pad, other touch pads than a corresponding touch pad are switched to perform the same role as the shield pad 300. Since this function has been described above, detailed description thereof will be omitted.

Figure 9:
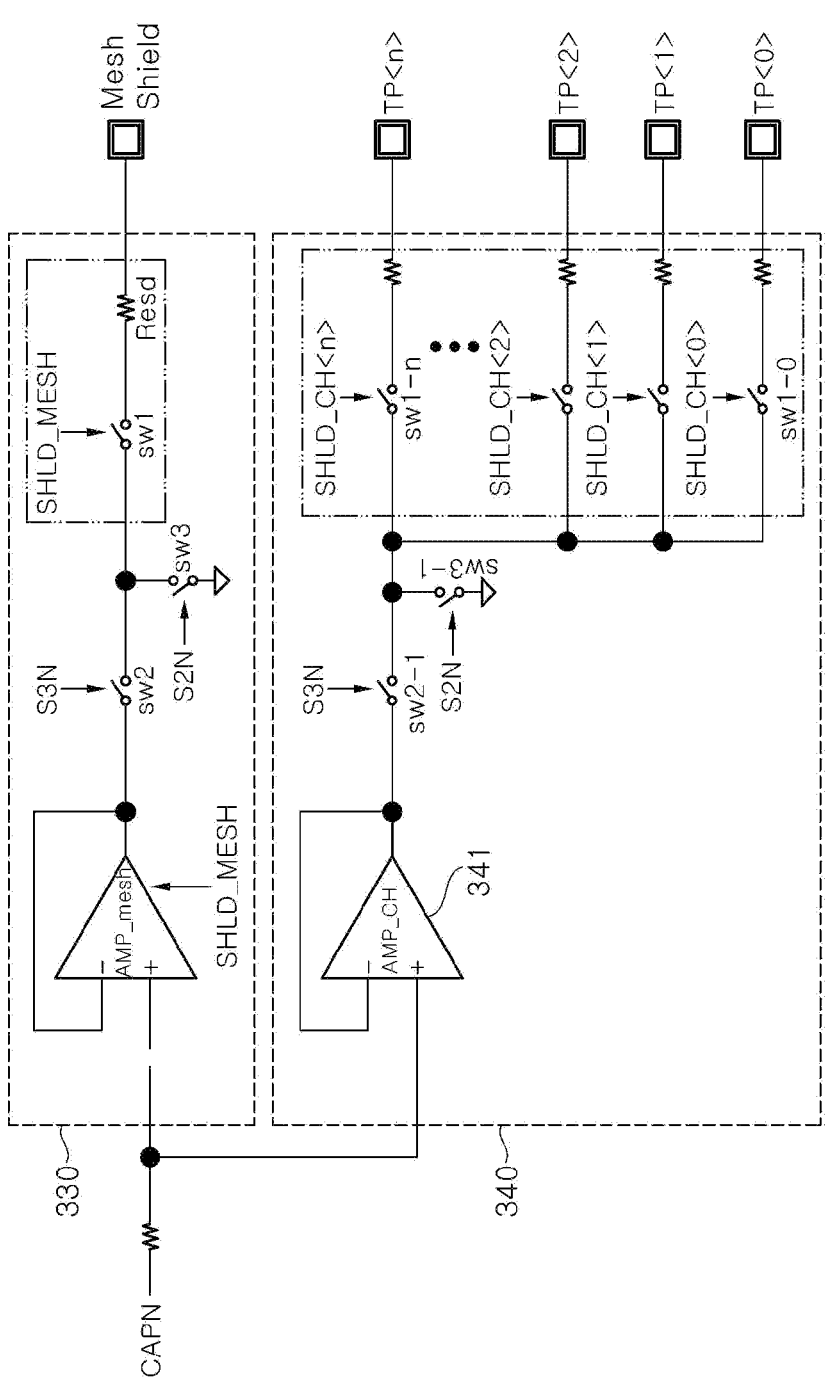
FIG. 9 shows one embodiment of a shield pad drive circuit and a shield channel drive circuit shown in FIG. 8.

FIG. 9 shows one embodiment of the shield pad part and the shield channel part shown in FIG. 8.

Referring to FIG. 9, since the shield pad part 330 is the same as that shown in FIG. 4, detailed description thereof will be omitted. The shield channel part 340 is the same as the shield pad part 330 except that a plurality of circuits each identical to a circuit of the shield pad part 330 indicated by the dash-dotted rectangle is arranged in parallel and switch control signals SHLD_MESH, SHLD_CH<0> to SHLD_CH<n> (n being a natural number) are different from those used in the shield pad part 330. In FIG. 9, a signal used in the shield pad part 330 is denoted by SHLD_MESH instead of SHLD_CH of FIG. 4 to be distinguished from the signal shown in FIG. 4.

FIG. 8 shows an example in which a water drop settles between one touch pad 102 among the plurality of touch pads 100 and the shield pad 300 or between two neighboring touch pads 102, 103.

In the embodiment according to the present invention shown in FIG. 8, assuming one touch pad among the plurality of touch pads 101 to 108 is a sensing target channel, the other touch pads are all operated as a shield pad. In this way, in an application in which a plurality of touch pads 100 is arranged in parallel, a water drop settling between the plurality of touch pads 100 can be ignored when determining the presence of a touch on each touch pad 100. This can be accomplished by counting the time taken for the voltage level of the fourth capacitor CAPN to drop to the reference voltage with only one of the plurality of switch control signals enabled while disabling the other switch control signals.

Switches included in all touch channels, excluding a touch channel corresponding to a selected one of the switch control signals SHLD_CH<0> to SHLD_CH<n>, are enabled to perform the same operation as the shield pad drive circuit.

As the number of touch pads 100 in FIG. 8 increases, the number of components within the dash-dotted rectangle of the shield channel part 340 shown in FIG. 9 will increase.

As the number of wires connecting the components (switches and resistors) within the dash-dotted rectangle increases, the capacitance between each wire and ground GND increases. This requires increase in driving capability of an amplifier 341 constituting the shield channel part 340, resulting in increased complexity of a circuit of the amplifier 341, increased area of a semiconductor chip occupied by the amplifier 341, and increased power consumption by the amplifier 341.

Accordingly, when the number of touch pads is large, an embodiment described below may be employed.

Figure 10:
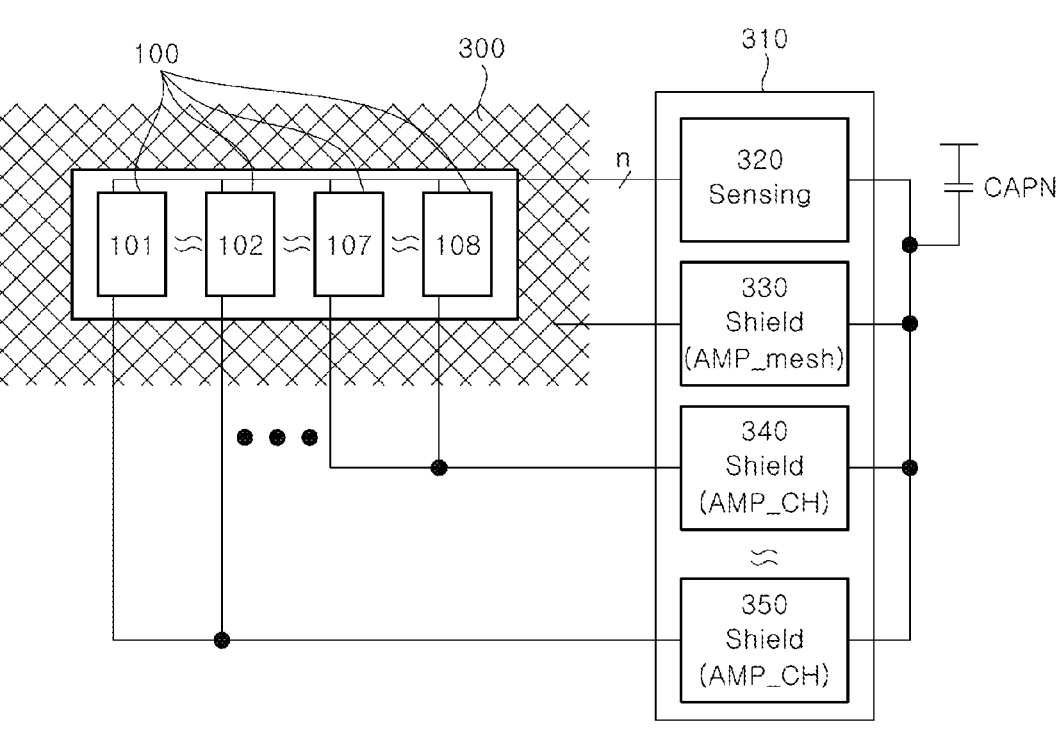
FIG. 10 shows an embodiment in which a plurality of amplifiers is used in a shield channel drive circuit.
Figure 12:
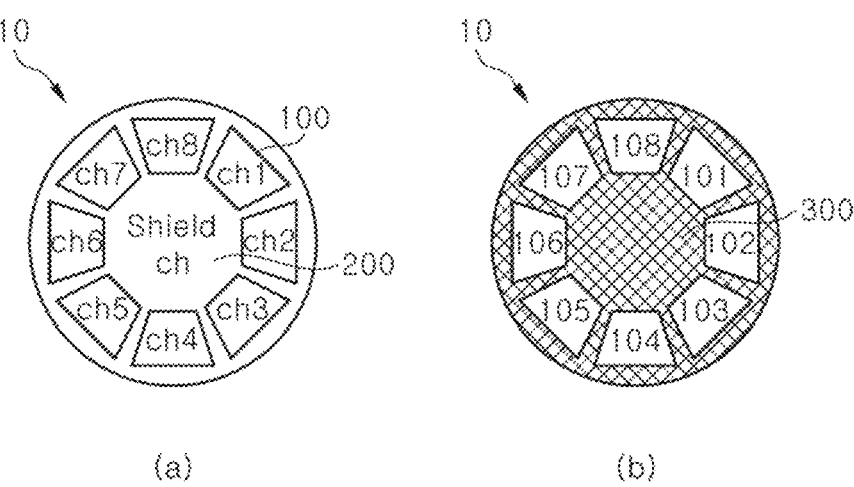
FIG. 12 is a view illustrating a touch pad of a touch wheel-type touch sensing device according to another embodiment of the present invention.
Figure 13:
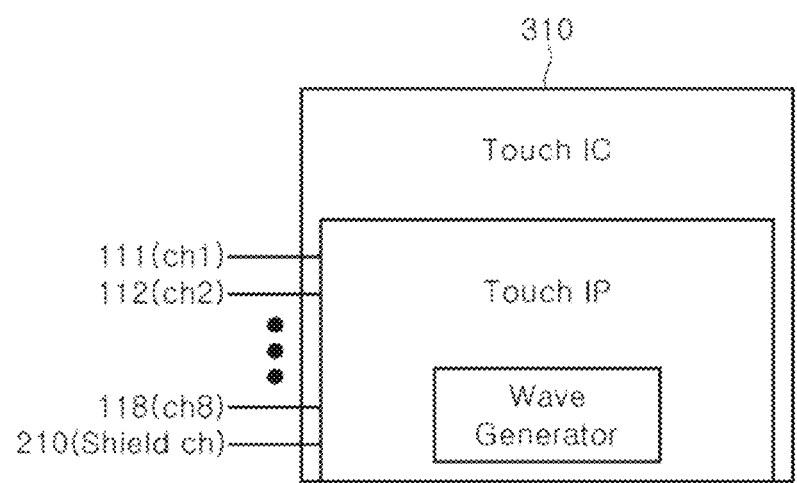
FIG. 13 is a schematic diagram illustrating a touch IC of the touch wheel-type touch sensing device according to the present invention.

FIG. 10 shows an embodiment in which a plurality of amplifiers is used in the shield channel part.

The embodiment of FIG. 10 is the same as the embodiment of FIG. 8 except that there are two shield channel parts 340, 350, rather than one shield channel part, and a plurality of touch pads 101 to 108 is distributed and connected to the two shield channel drive circuits 340, 350.

Figure 11:
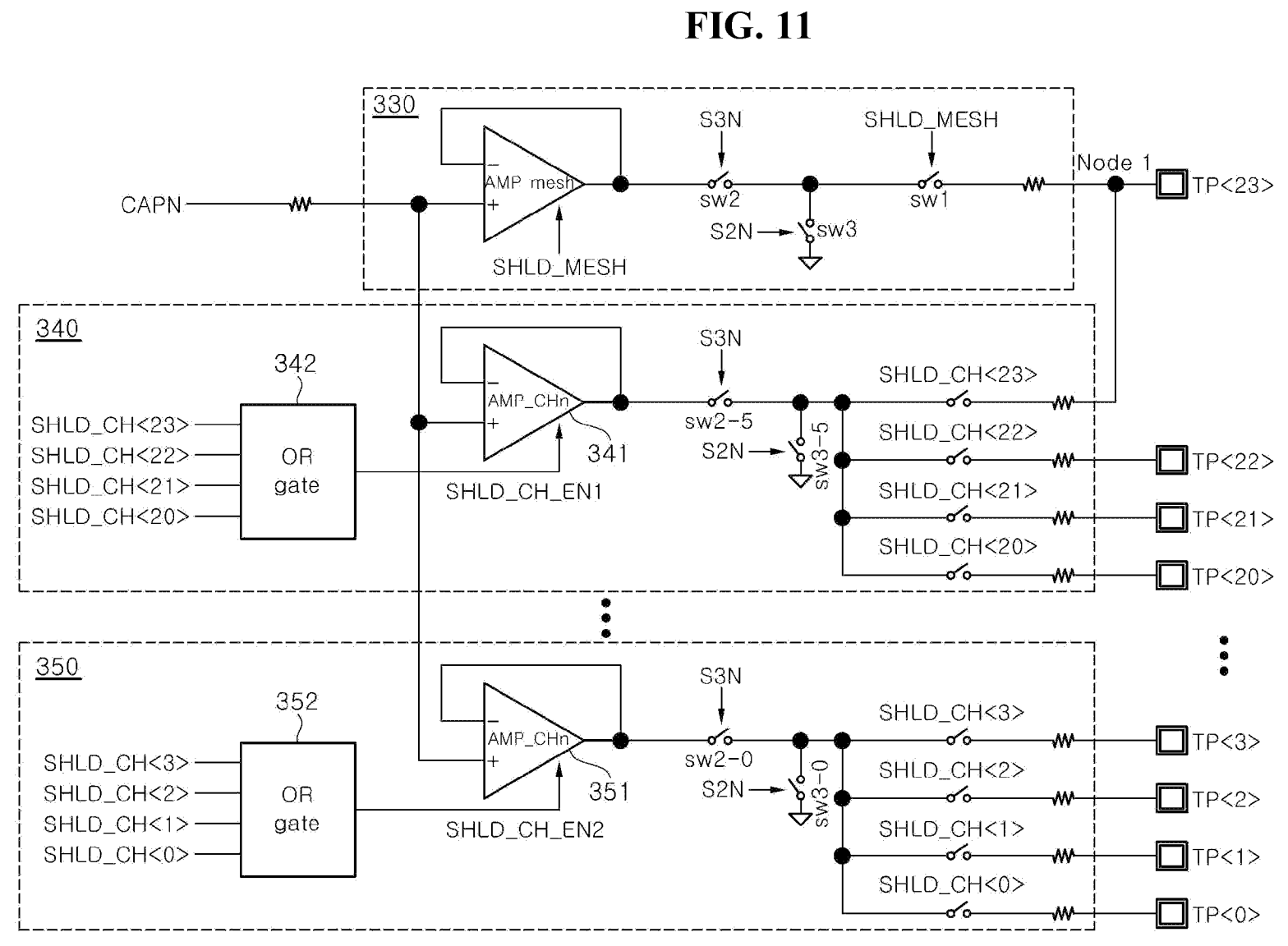

FIG. 11 shows one embodiment of the shield pad part and the shield channel part shown in FIG. 10.

Referring to FIG. 11, the two shield channel drive circuits 340, 350 are different from the shield channel part 340 shown in FIG. 9 in that a point in time at which respective amplifiers 341, 351 are enabled is controlled. Description of one of the two shield channel parts 340, 350 may be applied to the other.

The first amplifier 341 included in the first shield channel part 340 to be used as a buffer is only enabled upon detection of foreign matter through corresponding shield channels, wherein the corresponding shield channels of the amplifier 341 include SHLD_CH<20> to SHLD_CH<23>. Since the amplifier 341 is required to be only enabled upon enabling of the corresponding shield channels SHLD_CH<20> to SHLD_CH<23>, a first amplifier enable signal SHLD_CH_EN1 is generated by logical sum 1110 (OR) of corresponding shield channel enable signals SHLD_CH<20> to SHLD_CH<23> such that the amplifier 341 can be enabled upon enabling of any of the corresponding shield channel enable signals SHLD_CH<20> to SHLD_CH<23>.

Accordingly, a second amplifier enable signal SHLD_CH_EN2 applied to the second amplifier 351 included in the second shield channel part 350 to be used as a buffer causes the second amplifier 351 to only be enabled upon enabling of corresponding shield channels SHLD_CH<0> to SHLD_CH<3>.

Referring to FIG. 12 to FIG. 16, a touch sensing device having a malfunction prevention function according to another embodiment of the present invention includes a touch wheel-type touch pad. Specifically, the touch sensing device according to this embodiment includes: a touch wheel 10 having a plurality of touch pads 100 radially arranged thereon to recognize a user's touch; a shield pad 300 formed of a conductor and surrounding a periphery of the touch pads 100 of the touch wheel 10; and a sensing circuit 310 electrically connected to the touch wheel 10 and the shield pad 300 to detect a user touch on the touch wheel 10 and output a sensing waveform to the shield pad 300.

A sensing part 320 of the sensing circuit 310 is connected to the plurality of touch wheel pads 101 to 108 via sensing channels 111 to 118, respectively, and is connected to the shield pad 300 surrounding the periphery of the touch wheel pads 100 via a shield channel 210. The shield channel 210 outputs the same waveform as the sensing channels 111 to 118 to prevent a potential difference between the shield pad 300 and the touch wheel pads 100.

That is, a shield region 200 surrounding the periphery of the touch wheel pads 100 is connected to the shield channel 210 of the sensing circuit 310.

The shield channel 210 is a port that outputs the same waveform as the sensing channels 111 to 118 to prevent a potential difference between the touch wheel pads 100, the capacitances of which are sensed, and the shield pad 300 surrounding the touch wheel pads 100, thereby preventing a malfunction caused by conductive foreign matter, such as water.

Figure 14:
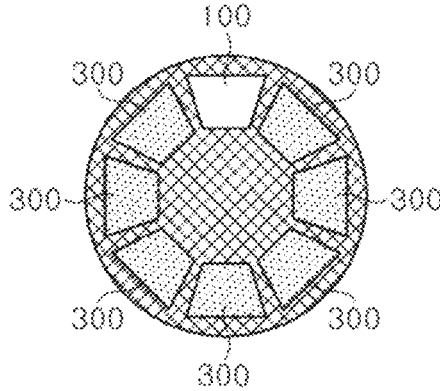
FIG. 14 is a view illustrating a touch pad and a shield pad of the touch wheel-type touch sensing device according to the present invention.

Referring to FIG. 14, upon detection of the presence of a user touch on one touch wheel pad among the plurality of touch wheel pads 101 to 108, the sensing circuit 310 allows the other touch wheel pads than the one touch wheel pad to output the same waveform as the shield channel such that the other touch wheel pads can perform the same role as the shield pad.

In addition, upon recognition of a user touch on the plurality of touch wheel pads 101 to 108, the sensing circuit 310 sequentially performs capacitive sensing for the plurality of touch wheel pads 101 to 108 through the sensing channels 111 to 118 while allowing touch wheel pads other than a sensing target to output the same waveform as the shield channel 210.

Figure 15:
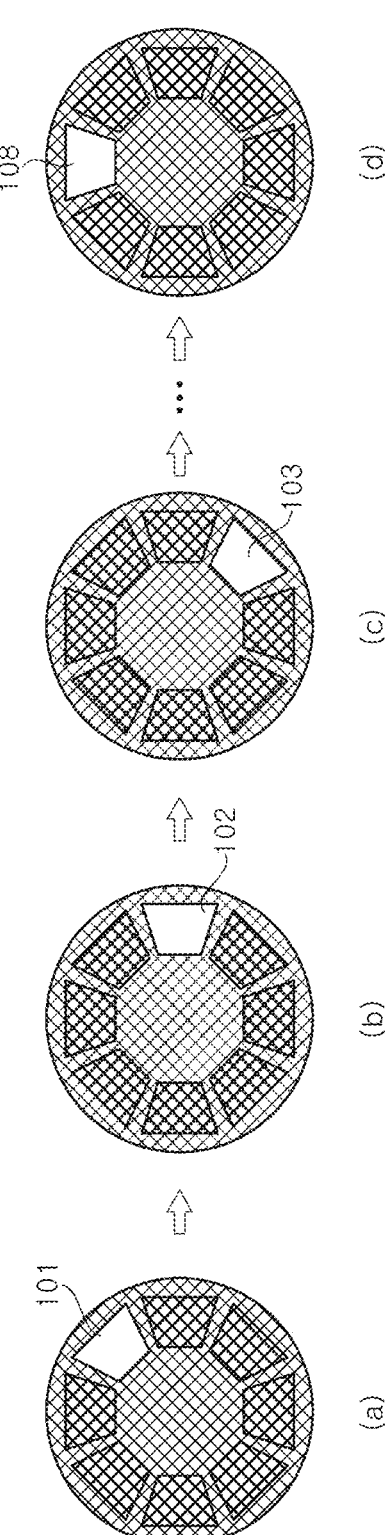
FIG. 15 is a view illustrating a process of controlling a sensing operation of a touch wheel pad of the touch wheel-type touch sensing device according to the present invention.

When the capacitance of the first touch wheel pad 101 is sensed, as shown in FIG. 15(*a*), the other touch wheel pads, that is, the second to eighth touch wheel pads 102 to 108 output the same waveform as the shield channel 210, such that there is no potential difference around the first touch wheel pad 101, the capacitance of which is sensed through a corresponding sensing channel. As a result, the magnitude of parasitic capacitance Cp around the touch wheel pad 101 decreases and the change in finger touch-induced capacitance Cf increases.

Accordingly, malfunction due to conductive foreign matter such as water can be prevented by performing capacitive sensing for each touch wheel pad in a sequential manner as shown in FIG. 15(*a*) to FIG. 15(*d*) while allowing sensing channels other than a sensing target to output the same waveform as the shield channel.

In addition, the shield channel 210 is enabled when the sensing circuit 310 sequentially determines the presence of a user touch on the touch wheel pads 100.

In this way, the shield channel is disabled until a user touches any of the touch wheel pads of the touch wheel, thereby providing enhanced touch sensitivity. The shield channel may be enabled upon detection of the presence of a user touch on the touch wheel pads 100.

Figure 16:
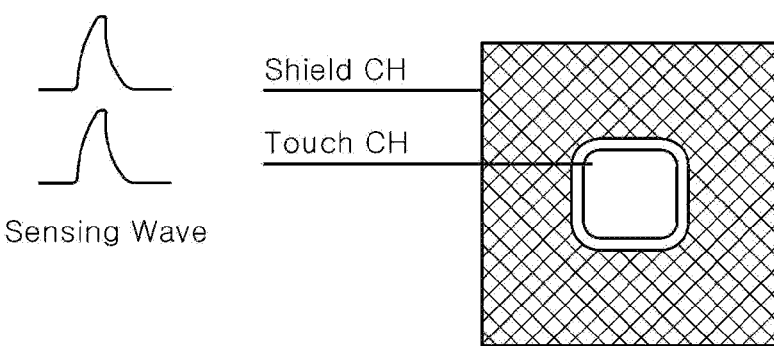
FIG. 16 is a view illustrating a sensing waveform in a shield channel according to another embodiment of the present invention.

Referring to FIG. 16, in the present invention, a counting waveform is the same for both the sensing channel and the shield channel. This is because the shield channel is enabled during detection of the presence of a user touch through the sensing channel such that a change in voltage level of the sensing channel is reflected in the shield channel.

Accordingly, when a water drop W settles between one of the touch wheel pads 100 and the shield pad 300, the sensing channel and the shield channel output the same waveform, thereby eliminating the influence of the water drop.

As such, by allowing waveforms from the sensing channel and the shield channel to be identical to each other upon settling of conductive foreign matter such as water between one of the touch wheel pads 100 and the shield pad 300, it is possible to minimize the possibility that settling of the conductive foreign matter will be mistaken for a user's touch.

In addition, the touch sensing device having a malfunction prevention function according to the present invention allows waveforms from the touch channel Touch CH (Node 1) and the shield channel Shield CH (Node 2) to be identical to each other upon settling of a water drop on the touch wheel pads and the shield pad, thereby minimizing the possibility that settling of the water drop will be mistaken for a user's touch.

In addition, in a structure in which a plurality of touch wheel pads 101 to 108 arranged in parallel are surrounded by one shield pad 300, each of the plurality of touch wheel pads 101 to 108 is connected in common to a sensing part 320 and a shield channel part 340. A structure in which the shield pad 300 is connected to a shield pad part 330 is the same as that in the embodiment shown in FIG. 3. The sensing part 320, the shield pad part 330, and the shield channel part 340 are connected to a fourth capacitor CAPN.

In addition, when the sensing part 320 detects the presence of a touch on each of the touch wheel pads, other touch wheel pads than a corresponding touch wheel pad are switched to perform the same role as the shield pad 300. Since this function has been described above, detailed description thereof will be omitted.

In addition, assuming that one touch wheel pad among the plurality of touch wheel pads 101 to 108 is a sensing target channel, the other touch wheel pads are all operated as a shield pad. In this way, in an application in which a plurality of touch wheel pads 101 to 108 is used in parallel, a water drop settling between the plurality of touch wheel pads 100 can be ignored when determining the presence of a touch on each touch wheel pad. This can be accomplished by counting the time taken for the voltage level of the fourth capacitor CAPN to drop to the reference voltage with only one of the plurality of switch control signals enabled while disabling the other switch control signals.

Switches included in all touch channels, excluding a touch channel corresponding to a selected one of the switch control signals SHLD_CH<0> to SHLD_CH<n>, are enabled to perform the same operation as the shield pad part.

Increase in number of touch wheel pads 101 to 108 requires increase in driving capability of the amplifier 341 constituting the shield channel part 340, resulting in increased complexity of a circuit of the amplifier 341, increased area of a semiconductor chip occupied by the amplifier 341, and increased power consumption by the amplifier 341. Accordingly, when the number of touch wheel pads is large, a plurality of amplifiers may be used.

Accordingly, in the structure in which the plurality of touch wheel pads 101 to 108 arranged in parallel is surrounded by the shield pad 300, each of the plurality of touch wheel pads 101 to 108 is connected in common to the sensing circuit 310 and the shield channel, as shown in FIG. 10.

When the sensing circuit 310 detects the presence of a touch on each of touch wheel pads 100 through a corresponding sensing channel, other touch wheel pads than a corresponding touch wheel pad are switched to perform the same role as the shield pad 300.

When a water drop settles between one of the touch wheel pads and the shield pad or between two neighboring touch wheel pads, assuming one touch wheel pad among the plurality of touch wheel pads 101 to 108 is a sensing target channel, the other touch wheel pads are all operated as a shield pad. In this way, a water drop settling between the plurality of touch wheel pads 101 to 108 can be ignored when determining the presence of a user touch on the plurality of touch wheel pads.

This can be accomplished by counting the time taken for the voltage level of the fourth capacitor to drop to the reference voltage with only one of the plurality of touch wheel pads enabled while disabling the other touch wheel pads.

Accordingly, touch wheel pads other than a selected touch wheel pad can perform the same operation as the shield pad.

In addition, the sensing circuit 310 may include an amplifier to buffer externally applied voltage. Since the capacitance between ground and a connector connected to each sensing circuit increases with increasing number of touch wheel pads, there may be provided a plurality of amplifiers each constituting a shield channel such that the touch wheel pads can be distributed and connected to the plurality of shield channels.

That is, the sensing circuit 310 may include: a sensing part 320 electrically connected to the touch wheel pads 100 to 100 detect a user touch on the touch wheel pads 100; a capacitor having one terminal connected to a first node connecting the touch wheel pads to the sensing part and the other terminal connected to ground; a shield pad part 330 electrically connected to the shield pad 300; and shield channel parts 340, 350 electrically connected to the plurality of touch wheel pads 101 to 108, wherein, when the sensing circuit detects the presence of a touch on each touch wheel pad, the shield channel parts 340, 350 switch other touch wheel pads than a corresponding touch wheel pad such that the other touch wheel pads perform the same role as the shield pad 300.

In addition, when conductive foreign matter settles between one of the touch wheel pads 100 and the shield pad 300, a capacitor is formed between the one touch wheel pad 100 and the shield pad 300 due to the foreign matter, and the shield pad part 330 and the shield channel parts 340, 350 may apply the same signal as a signal applied to one terminal of the capacitor to the other terminal of the capacitor.

For example, the first touch wheel pad 101 and the second touch wheel pad 102 may be connected to one shield channel, and the seventh touch wheel pad 107 and the eighth touch wheel pad 108 may be connected to another shield channel.

An amplifier included in a shield channel to be used as a buffer may only be enabled upon detection of foreign matter through the shield channel.

In this way, it is possible to control a point in time at which respective amplifiers of the plurality of shield channels are enabled.

For example, when a shield channel connected to the first touch wheel pad 101 and the second touch wheel pad 102 is enabled, an amplifier of the corresponding shield channel may be enabled and, when a shield channel connected to the seventh touch wheel pad 101 and the eighth touch wheel pad 102 is enabled, an amplifier of the corresponding shield channel may be enabled.

Thus, the shield channel part 340; 350 may include an amplifier 341; 351 buffering externally applied voltage; a second switch sw2 switching an output of the amplifier to the third node Node 3 in response to a third switch control signal S3N; a third switch sw3 switching the third node Node 3 to ground in response to a second switch control signal S2N; and at least one first switch sw1 each switching the third node Node 3 to a corresponding one of at least one touch wheel pad in response to a corresponding one of at least one shield channel control signal SHLD_CH.

When used in an application in which a single touch pad is used, the touch sensing device having a malfunction prevention function according to the present invention can distinguish settling of conductive foreign matter on the touch pad from a user touch on the touch pad, thereby preventing malfunction of the touch pad. In addition, when used in an application in which a plurality of touch pads is used in parallel, the touch sensing device according to the present invention can distinguish settling of conductive foreign matter between two neighboring touch pads or between one of the plurality of touch pads and a shield pad from a user's touch, thereby preventing malfunction of the touch pads.

The present invention may be implemented as computer-readable code on a computer-readable recording medium. The computer-readable recording medium may include any kind of recording medium storing data that can be read by a computer system.

For example, the computer-readable recording medium may include a hard disk drive (HDD), a solid state drive (SSD), a silicon disk drive (SDD), ROM, RAM, CD-ROM, a magnetic tape, a floppy disk, an optical data storage device, and the like.

Although the touch sensing device having a malfunction prevention function according to the present invention has been described with reference to some embodiments, it will be understood that the embodiments described herein may be embodied in a variety of other forms without departing from the spirit and scope of the invention.

Therefore, the scope of the invention should not be limited to the forgoing embodiments and should be defined by the accompanying claims and equivalents thereto.

That is, it should be understood that the forgoing embodiments are provided for illustration only and are not to be construed in any way as limiting the invention. In addition, the scope of the invention is indicated by the following claims rather than the detailed description of the embodiments, and all changes or modifications derived from the meaning and scope of the claims and equivalents thereto should be construed as being within the scope of the invention.

What is claimed is:

1. A touch sensing device having a malfunction prevention function, the touch sensing device comprising:
   a touch pad;
   a shield pad formed of a conductor and spaced apart from the touch pad to surround a periphery of the touch pad;
   a high-sensitivity sensing circuit electrically connected to the touch pad to detect a user touch on the touch pad;
   a first capacitor having one terminal connected to a first node connecting the touch pad to the high-sensitivity sensing circuit and the other terminal connected to ground; and
   a shield pad drive circuit electrically connected to the shield pad,
   wherein, when conductive foreign matter settles between the touch pad and the shield pad, a capacitor is formed between the touch pad and the shield pad due to the conductive foreign matter and the shield pad drive circuit applies the same signal as a signal applied to one terminal of the capacitor to the other terminal of the capacitor.

2. The touch sensing device according to claim 1, wherein the shield pad is provided in the form of a conductive mesh.

3. The touch sensing device according to claim 1, wherein the shield pad drive circuit comprises:
   an amplifier buffering externally applied voltage in response to a shield enable signal;
   a first switch switching a third node to a second node in response to a shield channel control signal;
   a second switch switching an output of the amplifier to the third node in response to a third switch control signal; and
   a third switch switching the third node to ground in response to a second switch control signal,
   the shield enable signal, the shield channel control signal, the second switch control signal, and the third switch control signal being identical to signals used when the high-sensitivity sensing circuit determines the presence of a user touch on the touch pad.

4. The touch sensing device according to claim 3, wherein the externally applied voltage is voltage stored in a fourth capacitor having one terminal connected to a power voltage and the other terminal connected to a positive input terminal of the amplifier.

5. The touch sensing device according to claim 4, wherein:
   the shield channel control signal is enabled when the high-sensitivity sensing circuit determines the presence of a user touch on the touch pad; and
   the shield enable signal is enabled after disabling a switch signal used to charge or discharge the fourth capacitor and remains enabled when the high-sensitivity sensing circuit determines the presence of a user touch on the touch pad.

6. A touch sensing device having a malfunction prevention function, the touch sensing device comprising:
   a plurality of touch pads;
   a shield pad formed of a conductor and spaced apart from the plurality of touch pads to surround an entire periphery of the plurality of touch pads;
   a high-sensitivity sensing circuit electrically connected to the plurality of touch pads to detect a user touch on the plurality of touch pads;
   a first capacitor having one terminal connected to a first node connecting the plurality of touch pads to the high-sensitivity sensing circuit and the other terminal connected to ground;
   a shield pad drive circuit electrically connected to the shield pad; and
   a shield channel drive circuit electrically connected to the plurality of touch pads,
   wherein, when the high-sensitivity sensing circuit detects the presence of a touch on each of the touch pads, the shield channel driving circuit switches other touch pads than a corresponding touch pad such that the other touch pads perform the same role as the shield pad; and
   when conductive foreign matter settles between two neighboring touch pads or between the shield pad and one of the plurality of touch pads, a capacitor is formed between the two neighboring touch pads or between the shield pad and the one touch pad due to the conductive foreign matter, and the shield pad drive circuit and the shield channel drive circuit apply the same signal as a signal applied to one terminal of the capacitor to the other terminal of the capacitor.

7. The touch sensing device according to claim 6, wherein the shield channel drive circuit comprises:
   an amplifier buffering externally applied voltage;
   a second switch switching an output of the amplifier to a third node in response to a third switch control signal;
   a third switch switching the third node to ground in response to a second switch control signal; and
   a first switch array comprising a plurality of first switches each switching the third node to a corresponding one of the plurality of touch pads in response to a corresponding one of a plurality of shield channel control signals.

8. A touch sensing device having a malfunction prevention function, the touch sensing device comprising:
   a plurality of touch pads;
   a shield pad formed of a conductor and surrounding an entire periphery of the plurality of touch pads;
   a high-sensitivity sensing circuit electrically connected to the plurality of touch pads to detect a user touch on the plurality of touch pads;
   a first capacitor having one terminal connected to a first node connecting the plurality of touch pads to the high-sensitivity sensing circuit and the other terminal grounded;
   a shield pad drive circuit electrically connected to the shield pad; and a shield channel drive circuit array comprising a plurality of shield channel drive circuits each electrically connected to some touch pads among the plurality of touch pads, wherein, when the high-sensitivity sensing circuit detects the presence of a touch on each of the touch pads, the shield channel drive circuit array switches other touch pads than a corresponding touch pad such that the other touch pads perform the same role as the shield pad; and when conductive foreign matter settles between two neighboring touch pads or between the shield pad and one of the plurality of touch pads, a capacitor is formed between the two neighboring touch pads or between the shield pad and the one touch pad due to the conductive foreign matter, and the shield pad drive circuit and the shield channel drive circuit array apply the same signal as a signal applied to one terminal of the capacitor to the other terminal of the capacitor.

9. The touch sensing device according to claim 8, wherein each of the plurality of shield channel drive circuits comprises:

an amplifier buffering externally applied voltage in response to a shield channel enable signal;

a second switch switching an output of the amplifier to a third node in response to a third switch control signal;

a third switch switching the third node to ground in response to a second switch control signal;

a first switch array comprising a plurality of first switches each switching the third node to a corresponding one of the plurality of touch pads in response to a corresponding one of a plurality of shield channel control signals; and a logical sum circuit generating the shield channel enable signal, the shield channel enable signal being enabled upon enabling at least one of the plurality of shield channel control signals.

10. A touch sensing device having a malfunction prevention function, the touch sensing device comprising:

a touch wheel having a plurality of touch pads radially arranged thereon to recognize a user's touch;

a shield pad formed of a conductor and surrounding a periphery of the plurality of touch pads of the touch wheel;

a sensing circuit electrically connected to the touch wheel and the shield pad to detect a user touch on the touch wheel and output a sensing waveform to the shield pad, wherein the sensing circuit is connected to the plurality of touch pads via respective sensing channels and is connected to the shield pad via a shield channel, and the shield channel outputs the same waveform as the sensing channels to prevent a potential difference between the shield pad and the touch pads, wherein, upon detection of the presence of a user touch on one touch pad among the plurality of touch pads, the sensing circuit allows other touch pads than the one touch pad to output the same waveform as the shield channel such that the other touch pads perform the same role as the shield pad.

11. The touch sensing device according to claim 10, wherein, upon recognition of a user touch on the plurality of touch pads, the sensing circuit sequentially performs capacitive sensing for the plurality of touch pads through the sensing channels and allows sensing channels other than a sensing target to output the same waveform as the shield channel.

12. The touch sensing device according to claim 11, wherein the shield channel is enabled when the sensing circuit sequentially determines the presence of a user touch on the touch pads of the touch wheel.

13. The touch sensing device according to claim 10, wherein the sensing circuit comprises:

a sensing part electrically connected to the touch wheel pads to detect a user touch on the touch wheel pads;

a capacitor having one terminal connected to a first node connecting the touch wheel pads to the sensing part and the other terminal connected to ground;

a shield pad part electrically connected to the shield pad; and a shield channel part electrically connected to the plurality of touch pads, wherein, when the sensing circuit detects the presence of a touch on each of the touch wheel pads, the shield channel part switches other touch wheel pads than a corresponding touch wheel pad such that the other touch wheel pads perform the same roles as the shield pad; and when conductive foreign matter settles between one of the plurality of touch wheel pads and the shield pad, a capacitor is formed between the one touch pad and the shield pad due to the foreign matter, and the shield pad part and the shield channel part apply the same signal as a signal applied to one terminal of the capacitor to the other terminal of the capacitor.

14. The touch sensing device according to claim 13, wherein the shield channel part comprises:

an amplifier buffering externally applied voltage;

a second switch switching an output of the amplifier to a third node in response to a third switch control signal;

a third switch switching the third node to ground in response to a second switch control signal; and at least one first switch each switching the third node to a corresponding one of the at least one touch pad in response to a corresponding one of at least one shield channel control signal.

\*    \*    \*    \*    \*